(12) United States Patent
Kim et al.

(10) Patent No.: US 10,007,789 B2
(45) Date of Patent: Jun. 26, 2018

(54) APPARATUS AND METHOD FOR DETECTING MALWARE CODE BY GENERATING AND ANALYZING BEHAVIOR PATTERN

(71) Applicant: ELECTRONICS AND TELECOMMUNICATIONS RESEARCH INSTITUTE, Daejeon (KR)

(72) Inventors: Hyun Joo Kim, Daejeon (KR); Jong Hyun Kim, Daejeon (KR); Ik Kyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 188 days.

(21) Appl. No.: 15/240,319

(22) Filed: Aug. 18, 2016

(65) Prior Publication Data
US 2017/0270299 A1    Sep. 21, 2017

(30) Foreign Application Priority Data
Mar. 17, 2016 (KR) .................. 10-2016-0032041

(51) Int. Cl.
G06F 21/56 (2013.01)
G06N 5/02 (2006.01)
(52) U.S. Cl.
CPC .......... *G06F 21/566* (2013.01); *G06N 5/022* (2013.01)
(58) Field of Classification Search
CPC .............................. G06F 21/566; G06N 5/022
See application file for complete search history.

(56) References Cited

U.S. PATENT DOCUMENTS 7,779,472 B1 * 8/2010 Lou .................. G06F 21/566
726/22
7,913,305 B2 * 3/2011 Bodorin ............ G06F 21/566
713/152

(Continued)

FOREIGN PATENT DOCUMENTS

| EP | 2228743 B1 | 4/2013 |
|---|---|---|
| KR | 10-2013-0085483 A | 7/2013 |
| KR | 10-1543237 B1 | 8/2015 |

OTHER PUBLICATIONS

In Kyeom Cho et al,, "Malware Similarity Analysis using API Sequence Alignments", Journal of Internet Services and Information Security (JISIS), Nov. 2014, pp. 103-114, vol. 4, No. 4., Seoul, Republic of Korea.

*Primary Examiner* — Beemnet Dada

(57) ABSTRACT

The present invention relates to an apparatus and a method for detecting a malware code by generating and analyzing behavior pattern. A malware code detecting apparatus includes a behavior pattern generating unit which defines a characteristic parameter which distinguishes and specifies behaviors of a malware code and normally executable programs, converts an API calling event corresponding to the defined characteristic parameter and generates a behavior pattern in accordance with a similarity for behaviors of converted API call sequences to store the behavior pattern in a behavior pattern DB; and a malware code detecting unit which converts the API calling event corresponding to the defined characteristic parameter when the target process is executed into the API call sequence and determines whether the behavior pattern is a malware code in accordance with a similarity for behaviors of the converted API call sequence and the sequence stored in the behavior pattern DB.

14 Claims, 8 Drawing Sheets

(56) References Cited

U.S. PATENT DOCUMENTS

| | | | |
|---|---|---|---|
| 8,181,248 B2 | 5/2012 | Oh et al. | |
| 8,464,345 B2 * | 6/2013 | Satish | G06F 21/552 |
| | | | 706/20 |
| 8,635,694 B2 * | 1/2014 | Malyshev | G06F 21/566 |
| | | | 713/188 |
| 8,935,789 B2 * | 1/2015 | Shukla | G06F 21/568 |
| | | | 713/164 |
| 9,600,665 B2 * | 3/2017 | Akiyama | G06F 21/54 |
| 9,680,848 B2 * | 6/2017 | Kim | H04L 63/1416 |
| 2010/0229239 A1 | 9/2010 | Rozenberg et al. | |
| 2013/0122861 A1 | 5/2013 | Kim et al. | |

* cited by examiner

[FIG.5]
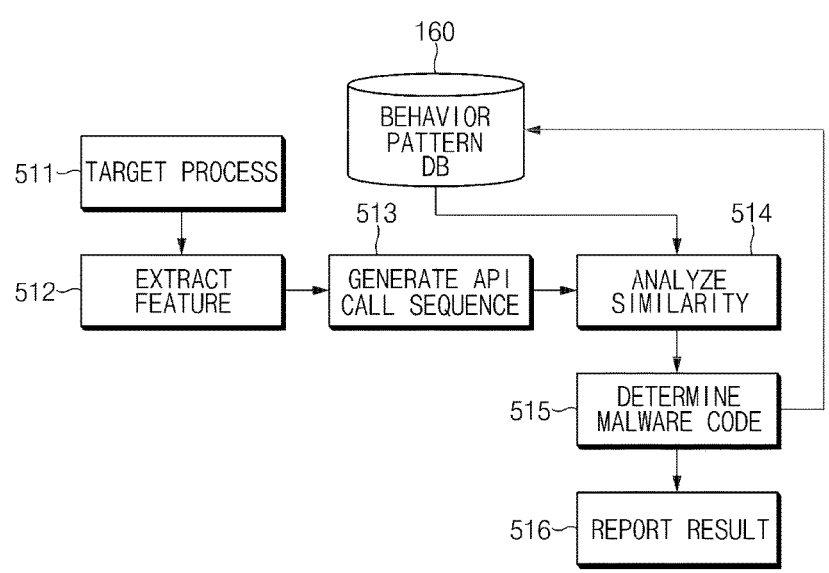

[FIG.6]
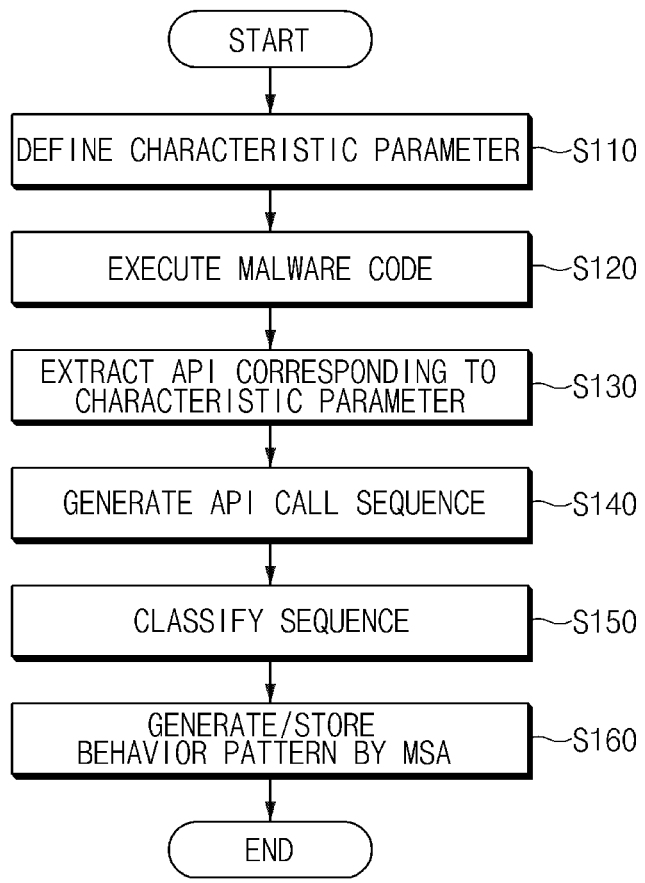

[FIG.7]
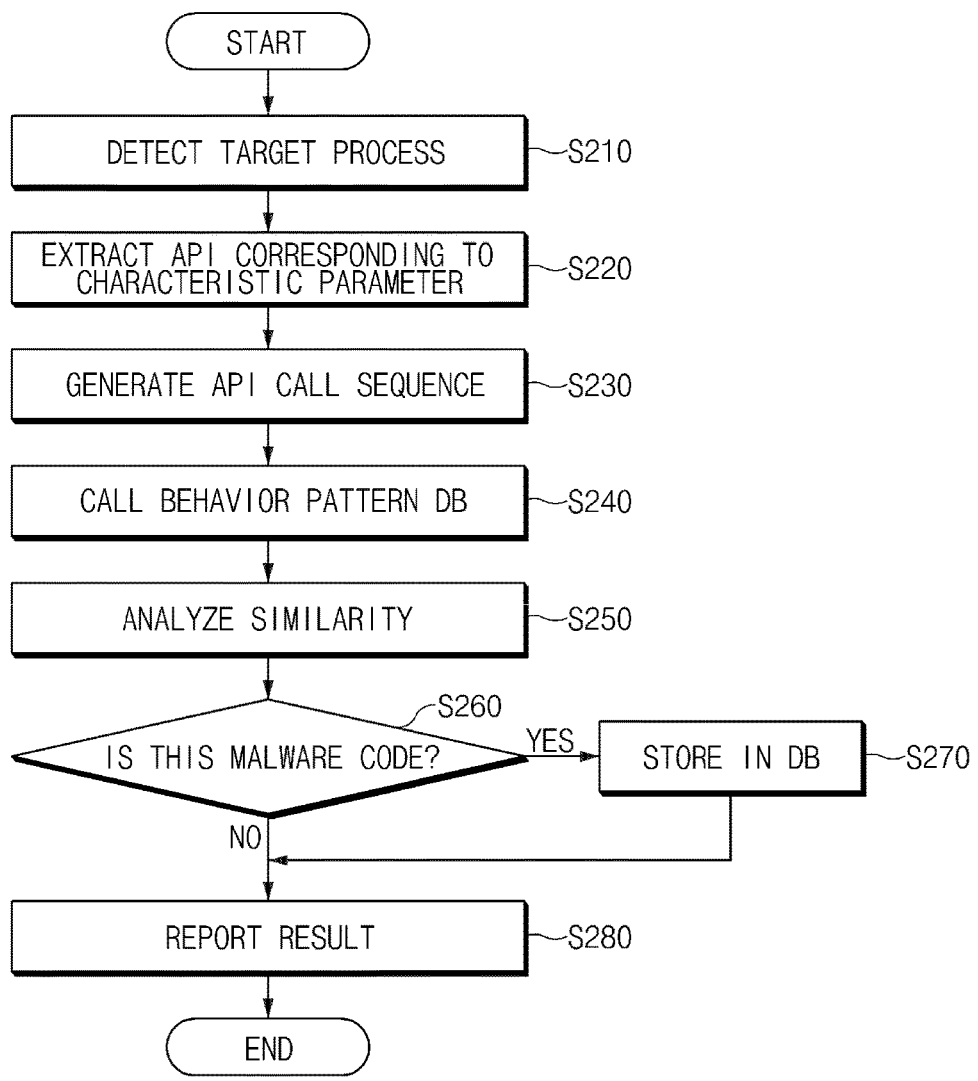

[FIG.8]
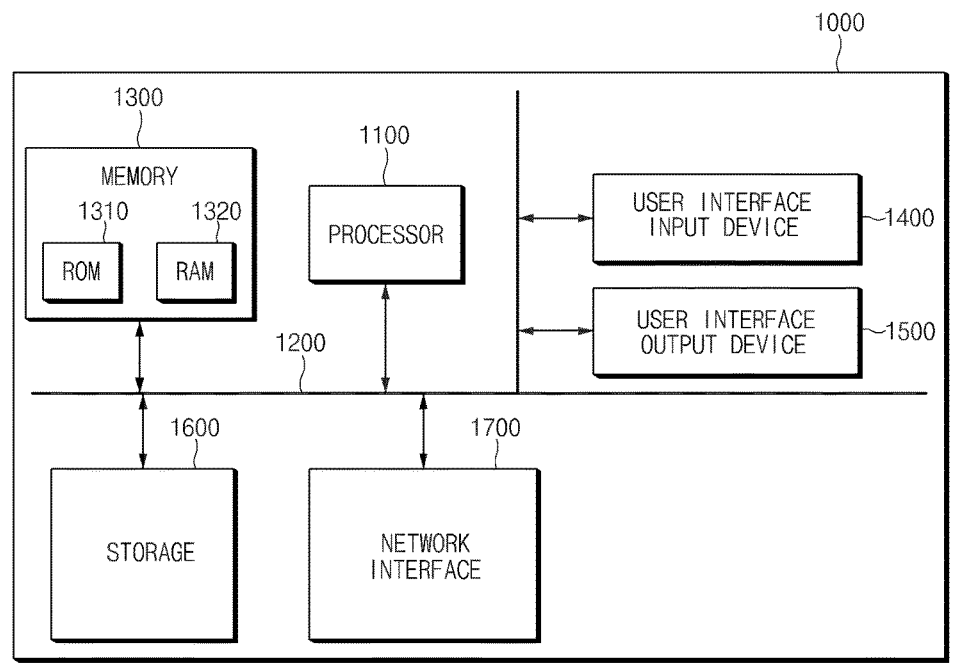

APPARATUS AND METHOD FOR DETECTING MALWARE CODE BY GENERATING AND ANALYZING BEHAVIOR PATTERN

CROSS-REFERENCE TO RELATED APPLICATIONS

This application claims priority to and the benefit of Korean Patent Application No. 10-2016-0032041 filed in the Korean Intellectual Property Office on Mar. 17, 2016, the entire contents of which are incorporated herein by reference.

TECHNICAL FIELD

The present invention relates to an apparatus and a method for detecting a malware code by generating and analyzing behavior pattern.

BACKGROUND ART

In accordance with rapid growth of a network infra, a malware code also spreads rapidly. Therefore, it becomes more difficult to detect or cope with the malware code which becomes a base unit of a cyber-attack.

According to the related art, a method for detecting a malware code includes a static analysis method which analyzes a source code of an executable file and a dynamic analysis method which uses a behavior or system information when the malware code is executed.

In the case of the static analysis method, it is possible for a hacker to make static analysis of a malware code impossible using a technique of compressing, packing, and encrypting an executable file.

In the case of the dynamic analysis method, a signature is generated by generating a specific conditional expression using statistic data or depending on whether there is information corresponding to a specific behavior. According to this method, accurate detection may be allowed. However, it is difficult to detect a metamorphic or unknown malware code.

SUMMARY OF THE INVENTION

The present invention has been made in an effort to provide a malware code detecting apparatus and method which extract a characteristic parameter for generating a behavior pattern and convert the characteristic parameter into a character sequence to be classified into groups and generate a distinct pattern based on a similarity to dynamically detect a malware code.

Technical objects of the present invention are not limited to the aforementioned technical objects and other technical objects which are not mentioned will be apparently appreciated by those skilled in the art from the following description.

An exemplary embodiment of the present invention provides a malware code detecting apparatus including a behavior pattern generating unit which defines a characteristic parameter which distinguishes and specifies behaviors of a malware code and normally executable programs, converts an API calling event corresponding to the defined characteristic parameter among API calling events called by a process generated by executing a previously collected malware code into an API call sequence and generates a behavior pattern in accordance with a similarity of behaviors of converted API call sequences to store the behavior pattern in a behavior pattern DB; and a malware code detecting unit which converts the API calling event corresponding to the defined characteristic parameter among the API calling events called by a target process when the target process is executed and determines whether the behavior pattern is a malware code in accordance with a similarity for behaviors of the converted sequence and the sequence stored in the behavior pattern DB.

The behavior pattern generating unit may generate an API call sequence in accordance with a time order based on an API calling event extracted for every process which is executed by the malware code.

The behavior pattern generating unit may classify the API call sequence corresponding to the API calling event into a plurality of groups using a decision tree which is trained in advance based on a statistic value of the API to be called, and apply the API call sequence which belongs to each classified group to a multiple sequence alignment (MSA) algorithm to analyze a similarity for the behavior pattern of the API call sequence which belongs to each group and classify each group into a plurality of sub groups in accordance with the similarity for the behavior pattern of the API call sequence which belongs to the group.

The behavior pattern generating unit may merge the API call sequences of each classified sub group in accordance with a similar behavior pattern to classify the API call sequence into a plurality of final groups.

The behavior pattern generating unit may align API call sequences which belong to the plurality of classified final groups with respect to an area having a high similarity through the MSA algorithm and generate a behavior pattern in accordance with an occurrence ratio of a character code corresponding to the API call sequence.

The characteristic parameter may be defined so that the API calling event which is called by a process by the malware code is classified into 'Process', 'Thread', 'Memory', 'File', 'Registry', 'Network', 'Service', and 'Other' and character code information corresponding to each API calling event may be defined.

The malware code detecting unit may generate an API call sequence in accordance with a time order based on an API calling event corresponding to a characteristic parameter among API calling events called by the target process.

The malware code detecting unit may use the generated API call sequence and a sequence of the malware code group stored in the behavior pattern DB as an input value to calculate a longest common subsequence (LCS) of two sequences; and compare the calculated length of the LCS and a shortest length of the two sequences to measure a similarity between two sequences.

The malware code detecting unit may additionally store a behavior pattern of the API call sequence which is detected as a malware code in the behavior pattern DB.

An exemplary embodiment of the present invention provides a malware code detecting method including: defining a characteristic parameter which distinguishes and specifies behaviors of a malware code and normally executable programs; converting an API calling event of each process corresponding to the defined characteristic parameter among API calling events called by a process generated by executing a previously collected malware code into an API call sequence; generating a behavior pattern in accordance with a similarity for behaviors of converted API call sequences to store the generated behavior pattern in a behavior pattern DB; converting an API calling event of a target process corresponding to the defined characteristic parameter among API calling events called by a target process when the target process is executed, into an API call sequence; and determining whether the behavior pattern is a malware code in accordance with the similarity of the behaviors of the converted API call sequence and a sequence stored in the behavior pattern DB.

The converting of an API calling event of each process into an API call sequence may include generating an API call sequence in accordance with a time order based on an API calling event extracted for every process which is executed by the malware code.

The malware code detecting method may further include before the storing of the generated behavior pattern into a behavior pattern DB, classifying the API call sequence generated corresponding to the API calling event into a plurality of groups using a decision tree which is trained in advance based on a statistic value of the API to be called, applying the API call sequence which belongs to each classified group to a multiple sequence alignment (MSA) algorithm to analyze a similarity for the behavior pattern of the API call sequence which belongs to each group and classifying each group into a plurality of sub groups in accordance with the similarity for the behavior pattern of the API call sequence which belongs to the group; and merging the API call sequences of each classified sub group in accordance with a similar behavior pattern to classify the API call sequence into a plurality of final groups.

The storing of the generated behavior pattern into a behavior pattern DB may include aligning API call sequences which belong to the plurality of classified final groups with respect to an area having a high similarity through the MSA algorithm and generating a behavior pattern in accordance with an occurrence ratio of a character code corresponding to the API call sequence.

The converting of an API calling event of the target process into an API call sequence may include generating an API call sequence in accordance with a time order based on an API calling event corresponding to a characteristic parameter among API calling events called by the target process.

The determining of whether the behavior pattern is a malware code may include using the generated API call sequence and a sequence of the malware code group stored in the behavior pattern DB as an input value to calculate a longest common subsequence (LCS) of two sequences; and comparing the calculated length of the LCS and a shortest length of the two sequences to measure a similarity between two sequences. Here, as the similarity measuring method, a sequence similarity measuring algorithm may be used instead of the LCS.

The malware code detecting method may further include additionally storing a behavior pattern of the API call sequence which is detected as a malware code in the behavior pattern DB. The behavior pattern of the API call sequence which is detected as an additional malware code may be used to update a behavior pattern of the malware code group.

According to an exemplary embodiment of the present invention, it is possible to extract a characteristic parameter for generating a behavior pattern and convert the characteristic parameter into a character sequence to be classified into groups and generate a distinct pattern based on a similarity to dynamically detect a malware code. It is also possible to detect a metamorphic or unknown malware code.

BRIEF DESCRIPTION OF THE DRAWINGS

FIG. 5 is a view illustrating an exemplary embodiment for explaining a malware code detecting operation of a malware code detecting apparatus according to an exemplary embodiment of the present invention.

FIGS. 6 and 7 are flowcharts illustrating flows of an operation for a malware code detecting method according to an exemplary embodiment of the present invention.

FIG. 8 is a view illustrating a configuration of a computing system to which an apparatus according to an exemplary embodiment of the present invention is applied.

Figure 1:
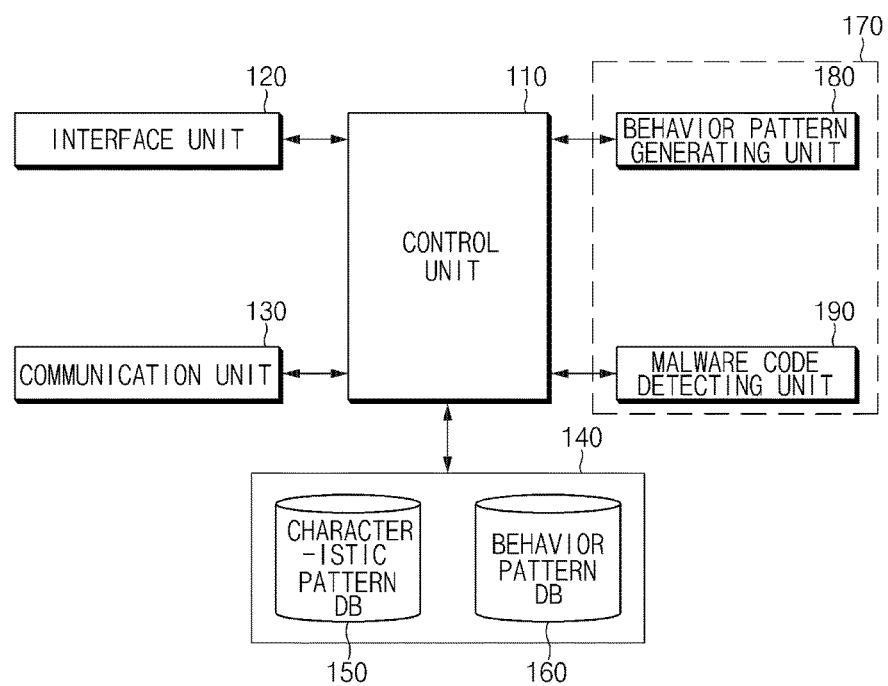
FIG. 1 is a view illustrating a configuration of a malware code detecting apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the accompanying drawings. When reference numerals denote components in the drawings, even though the like components are illustrated in different drawings, it should be understood that like reference numerals refer to the same components. In describing the embodiments of the present invention, when it is determined that the detailed description of the known configuration or function related to the present invention may obscure the understanding of exemplary embodiments of the present invention, the detailed description thereof will be omitted.

In describing components of the exemplary embodiment of the present invention, terminologies such as first, second, A, B, (a), (b), and the like may be used. However, such terminologies are used only to distinguish a component from another component but nature, a sequence or an order of the component is not limited by the terminologies. If not contrarily defined, all terminologies used herein including technological or scientific terms have the same meaning as those generally understood by a person with ordinary skill in the art. Terminologies which are defined in a generally used dictionary should be interpreted to have the same meaning as the meaning in the context of the related art but are not interpreted as ideal or excessively formal meaning if they are not clearly defined in the present invention.

FIG. 1 is a view illustrating a configuration of a malware code detecting apparatus according to an exemplary embodiment of the present invention.

Referring to FIG. 1, a malware code detecting apparatus according to an exemplary embodiment of the present invention includes a control unit 110, an interface unit 120, a communication unit 130, a storing unit 140, and a signal processing unit 170. Here, the control unit 110 may process a signal which is transmitted between individual units of the malware code detecting apparatus.

The interface unit 120 may include an input unit which receives a predetermined control command from a user. A key button may be used as an input unit. Further, any of the units which receive a control command from the user may be used as an input unit.

The interface unit 120 may include an output unit which outputs an operation state and result of the malware code detecting apparatus. As the output unit, a display on which information such as an operation state and result of the malware code detecting apparatus is displayed and a speaker which provides the result through a voice may be included.

In this case, the display may include a liquid crystal display (LCD), a thin film transistor liquid crystal display (TFT LCD), an organic light emitting diode (OLED), a flexible display, a field emission display (FED), and a three dimensional display (3D display). It is obvious that various types of displays may be implemented depending on the exemplary embodiments.

The communication unit 130 may include a communication module which supports a communication interface with an external system or a server.

Here, the communication module may include a module for wireless internet connection, a module for short range communication or a module for wired communication.

In this case, the wireless internet technique may include wireless LAN (WLAN), wireless broadband (Wibro), Wi-Fi, world interoperability for microwave access (Wimax), and high speed downlink packet access (HSDPA). Further, the short range communication technique may include Bluetooth, ZigBee, ultra-wideband (UWB), radio frequency identification (RFID), and infrared data association (IrDA). Further, the wired communication technique may include universal serial bus (USB) communication.

The storing unit 140 may store data and program required to operate the malware code detecting apparatus. For example, the storing unit 140 may store an algorithm and a control command for generating a behavior pattern corresponding to the malware code. Further, the storing unit 140 may include a characteristic parameter DB 150 in which characteristic parameter information defined to detect the malware code is stored and a behavior pattern DB 160 in which behavior pattern information regarding a malware code which is previously generated is stored.

The storing unit 140 may include at least one storing medium of a flash memory type, a hard disk type, a multimedia card micro type, a card type memory (for example, an SD or XD memory), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM).

The signal processing unit 170 generates a behavior pattern corresponding to the malware code and detects the malware code based on the generated behavior pattern.

Therefore, the signal processing unit 170 may include a behavior pattern generating unit 180 and the malware code detecting unit 190.

First, the behavior pattern generating unit 180 serves to generate a behavior pattern of the malware code. The behavior pattern generating operation of the behavior pattern generating unit 180 will be described in more detail with reference to FIG. 2.

Figure 2:
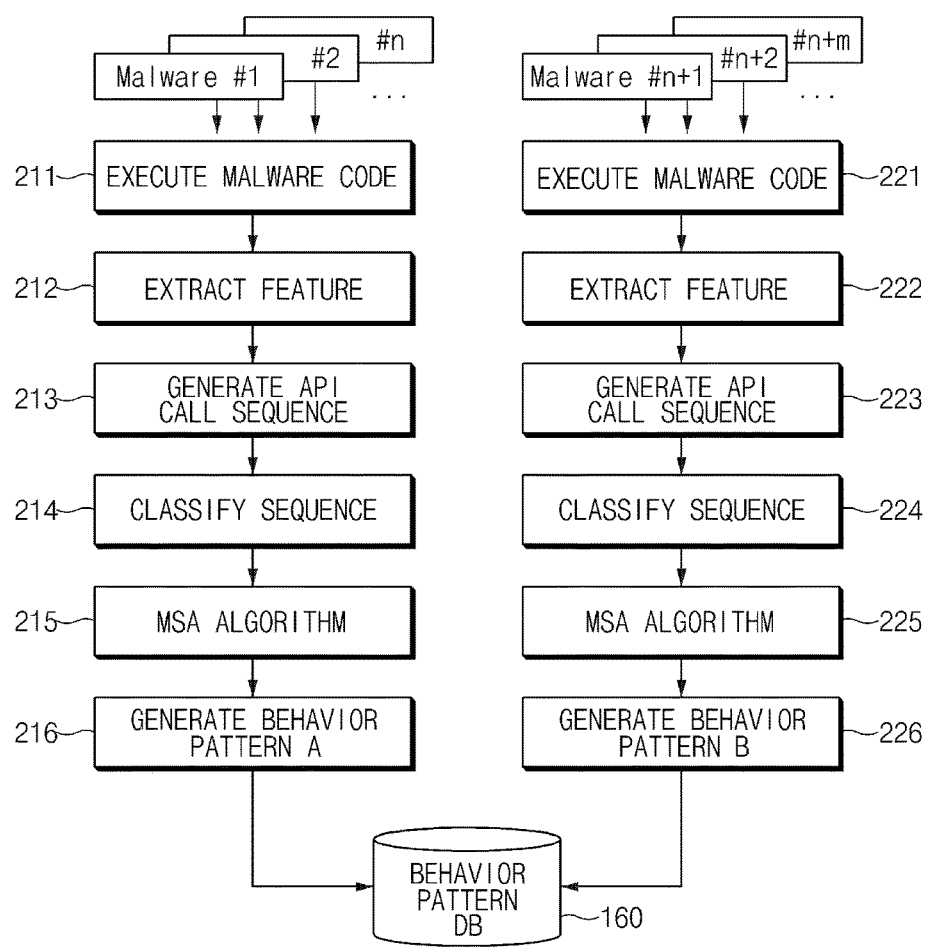
FIG. 2 is a view illustrating an exemplary embodiment for explaining a behavior pattern generating operation of a malware code detecting apparatus according to an exemplary embodiment of the present invention.

Referring to FIG. 2, a behavior pattern generating process of a malware code which is performed in the behavior pattern generating unit 180 will be described by being divided into seven steps.

First, in a first step, the behavior pattern generating unit 180 defines a characteristic parameter indicating malware code related information from malware code related data which is previously collected.

The characteristic parameter is information required to generate a behavior pattern of the malware code. Since the behavior pattern generating unit 180 generates a behavior pattern using an API call sequence which is called by the malware code, the behavior pattern generating unit 180 may define an API which may define an inherent behavior pattern of the malware code.

The characteristic parameter defined by the behavior pattern generating unit 180 may be represented by the following Table 1. As represented in Table 1, the behavior pattern generating unit 180 may define an alphabet code for generating an API, an API call sequence, and a character string sequence as a characteristic parameter.

For example, the behavior pattern generating unit 180 defines the API called by the process by the malware code by eight categories ('Process', 'Thread', 'Memory', 'File', 'Registry', 'Network', 'Service', 'Other') and 26 classes. However, the characteristic parameter defined in Table 1 is merely an exemplary embodiment but is not limited thereto and modified into various forms in accordance with the exemplary embodiments.

TABLE 1

| Category | API Class Name | API Calls | Code |
|---|---|---|---|
| Process | CreateProcess | NtCreateProcess, NtCreateProcessFx, NtCreateUserProcess, . . . | A |
| | ExitPrecess | RtlExitUserProcess | E |
| | TerminateProcess | NtTerminateProcess | T |
| | OpenProcess | NtOpenProcess | Q |
| Thread | CreateRemoteThread | NtCreateThread | J |
| | ExitThread | RtlExitUserThread, ExitThread | Z |
| | OpenThread | NtOpenThread | H |
| | SuspendThread | NtSuspendThread | I |
| Memory | WriteProcessMemory | NtWriteVirtualMemory | M |
| | VirtualAlloc | VirtyalAlloc, VirtualAllocEX, VirtualAllocEXNuma, | V |
| | VirtualProtect | VirtualProtect, VirtualProtectEX, NtProtectVirtualMemory | P |
| File | MoveFile | MoveFileWithProgressW | B |
| | WriteFile | NtWriteFile | W |
| | SearchFile | FindFirstFileExW | F |
| Registry | WriteRegistry | RegSetValueExA, RegSetValueExW, NtSetValueKey, NtSaveKey, NtSaveKeyEx, NeRenameKey, NtReplaceKey | R |
| Network | Connect | Connect | K |
| | Listen | Listen | X |
| | Send | Send, SendTo, WSASend, WSASendTo | N |
| | Recv | Recv, RecvFrom, WSARecv, WSARecvFrom | U |
| | Download | InternalInternetOpenUrlA, InternalInternetOpenUrlW, InternalHttpOpenRequestA, InternalHttpOpenRequestW, | D |

TABLE 1-continued

| Category | API Class Name | API Calls | Code |
|---|---|---|---|
| | | URLDownloadToFileW | |
| Service | CreateService | CreateServiceA, CreateServiceW | C |
| | DeleteService | DeleteService | G |
| | OpenService | OpenServiceA, OpenServiceW | O |
| | StartService | StartServiceA, StartServiceW | Y |
| Other | LoadLibrary | LdrLoadDll | L |
| | SetSecurity | NtSetSecurityObject, NtAdjustPrivilegesToken | S |

Next, in a second step, the behavior pattern generating unit 180 may execute the malware code which is previously collected. The behavior pattern generating operation is a dynamic analysis method which uses an API called when the malware code is executed. Therefore, a virtual machine or a program which restores an operating system (OS) which is infected by the executed malware code needs to be provided in advance.

In a third step, the behavior pattern generating unit 180 extracts an event of calling API which is defined as a characteristic parameter in the first step, among APIs called by the process when the malware code is executed. In this case, the behavior pattern generating unit 180 records the API which is called for every process.

In a fourth step, the behavior pattern generating unit 180 generates the API call sequence in accordance with a time order, based on the API calling event extracted for every process. In this case, the behavior pattern generating unit 180 converts API call information into a text to be processed in accordance with the time order.

For example, the behavior pattern generating unit 180 may convert the API call information into an alphabet character based on the code information corresponding to the API call sequence defined in Table 1.

In the fifth step, the behavior pattern generating unit 180 may classify the API call sequence generated in the fourth step. In this case, the behavior pattern generating unit 180 may classify the API call sequence to generate a group which will be applied to a multiple sequence alignment (MSA) algorithm.

Figure 3:
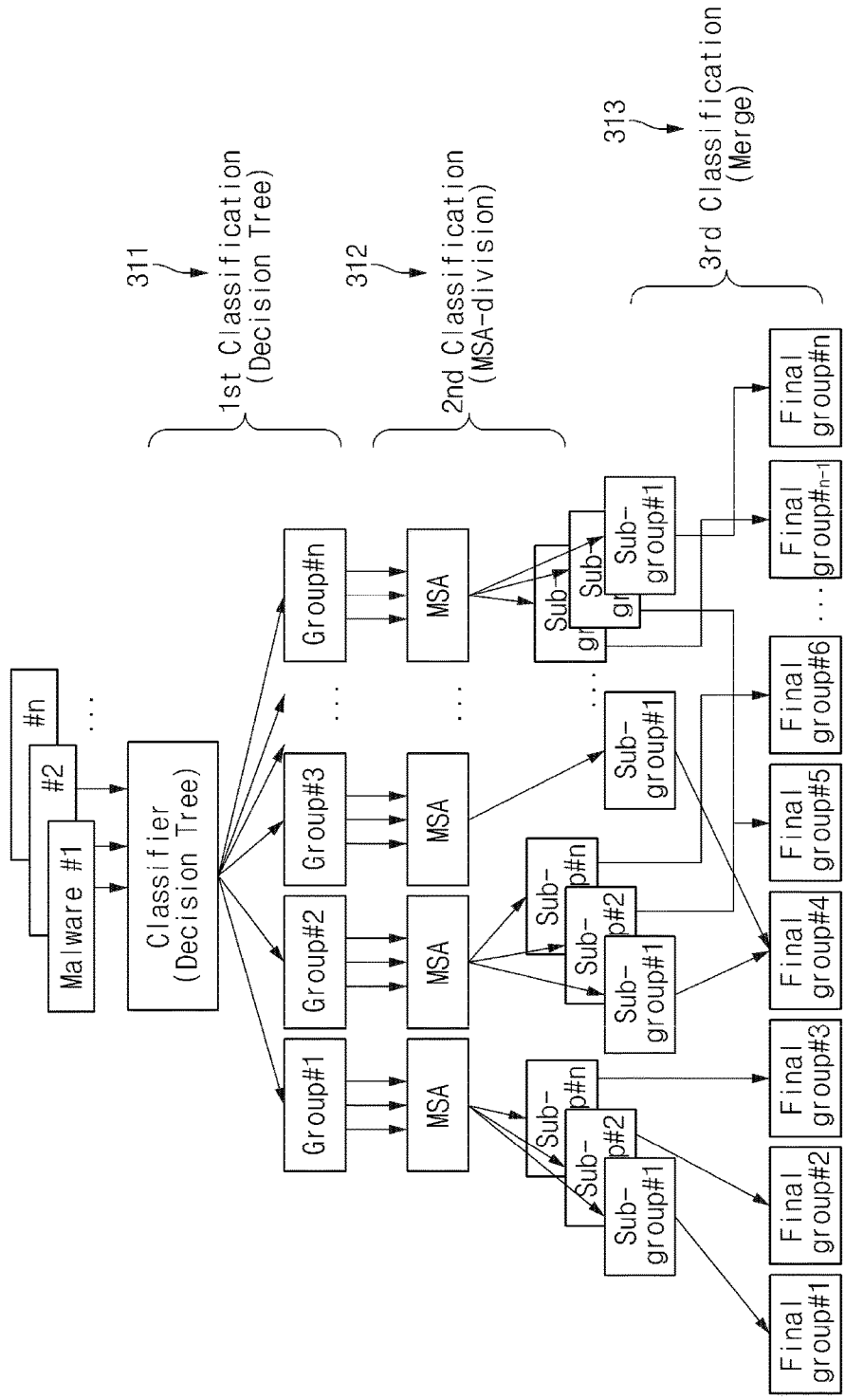
FIG. 3 is a view illustrating an exemplary embodiment for explaining a sequence classifying operation of a malware code detecting apparatus according to an exemplary embodiment of the present invention.

Therefore, the operation of classifying the API call sequence may be represented as illustrated in FIG. 3.

As illustrated in FIG. 3, the behavior pattern generating unit 180 may classify the API call sequence through three classification processes.

First, the behavior pattern generating unit 180 may perform first classification on the API call sequence using a decision tree.

Here, the decision tree which is used for the first classification is trained in advance based on a statistic value of an API to be called. However, the behavior pattern generating unit 180 may perform the first classification based on a diagnosed name which is diagnosed in an anti-virus system instead of the decision tree.

In this case, the behavior pattern generating unit 180 may classify the API call sequence into n groups Group#1, Group#2, Group#3, ... , Group#n through the first classification process.

When the first classification of the API call sequence is completed, the behavior pattern generating unit 180 performs second classification on the API call sequence on which the first classification is performed, using the MSA algorithm.

The second classification process is a division process. The behavior pattern generating unit 180 applies the MSA algorithm to the API call sequence which belongs to the n groups which are primarily classified to extract a common behavior pattern of the API call sequence which belongs to each group. In this case, the behavior pattern generating unit 180 analyzes a similarity of the API call sequence which belongs to each group based on the behavior pattern which is extracted through the MSA algorithm to classify the API call sequence by similar sequences.

Here, the n groups may be divided into one or more sub groups having a similar behavior pattern through the second classification process.

When the second classification of the API call sequence is completed, the behavior pattern generating unit 180 merges the API call sequences of each sub groups on which the second classification is performed to perform third classification.

A third classification process is a final classification process. The behavior pattern generating unit 180 merges the sub groups by the second classification in accordance with a similar behavior pattern of the API call sequence to classify the sub groups into m final groups Final Group#1, Final Group#2, Final Group#3, ... , Final Group#m. Here, the behavior pattern generating unit 180 may merge a sub group which belongs to any one group with a sub group which belongs to another group.

In a sixth step, the behavior pattern generating unit 180 generates a behavior pattern using an API call sequence which is classified into m final groups in the fifth step.

The behavior pattern generating unit 180 generates a behavior pattern corresponding to a sequence for every final group using the MSA algorithm in the sixth step.

Figure 4:
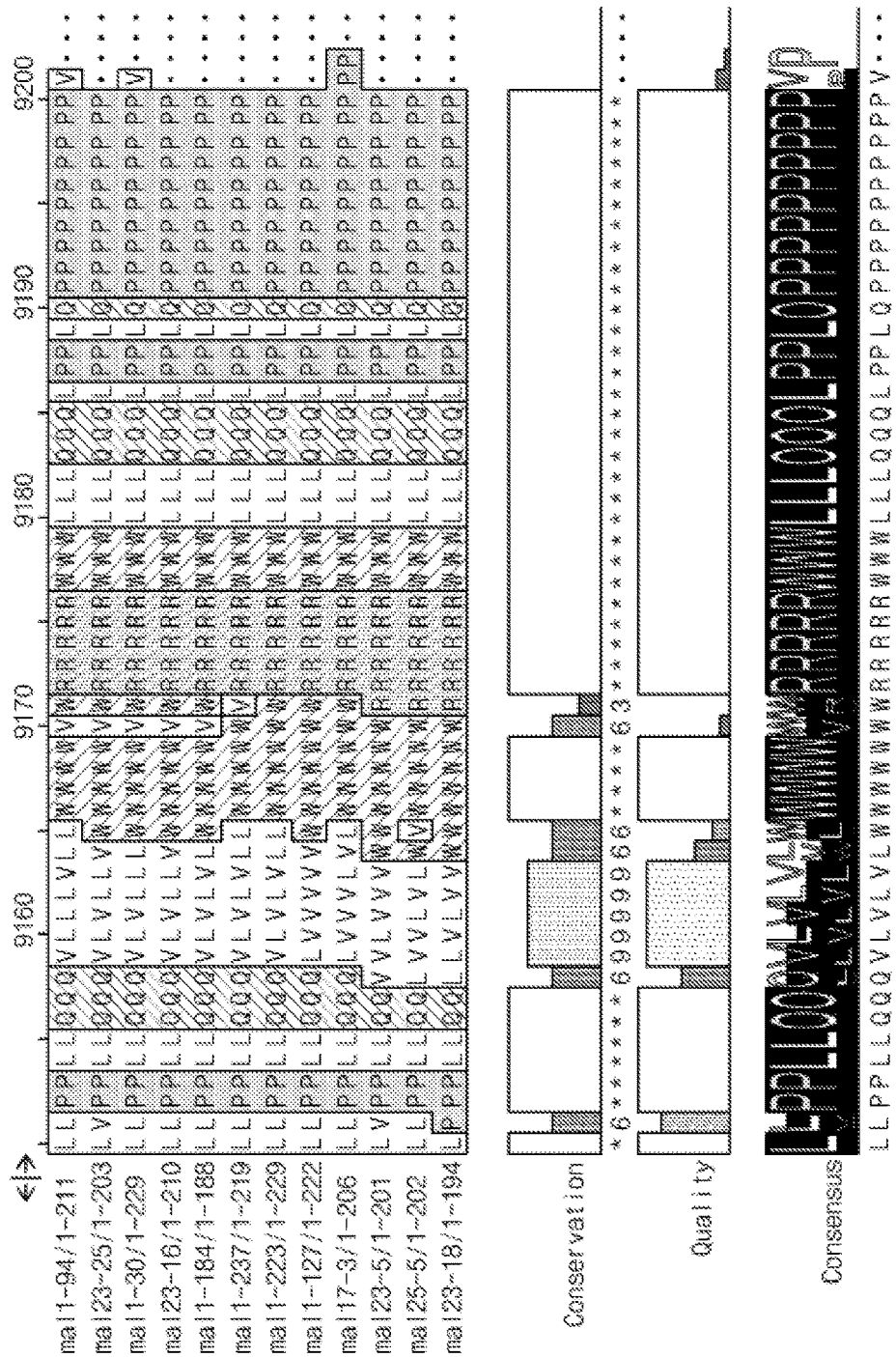
FIG. 4 is a view illustrating an exemplary embodiment for explaining a sequence aligning operation of a malware code detecting apparatus according to an exemplary embodiment of the present invention.

First, the behavior pattern generating unit 180 aligns sequences with respect to an area having a high similarity through the MSA algorithm. An exemplary embodiment thereof will be described with reference to FIG. 4.

In this case, the MSA algorithm performs analysis using a user definition matrix. The user definition matrix is generated by representing an alphabet corresponding to a characteristic parameter and a relationship therebetween by numbers.

Characters corresponding to positions of sequences which are aligned in accordance with the similarity have ratios corresponding to occurrence times of the character. Therefore, the behavior pattern generating unit 180 generates an inherent behavior pattern in accordance with a threshold of the occurrence ratio of the characters. Here, when the threshold becomes higher, the length of the generated behavior pattern becomes smaller, but it refers to a behavior sequence which needs to be necessarily commonly performed. In the meantime, when the threshold of the behavior pattern is relatively low, the behavior pattern refers to a behavior pattern which belongs to a corresponding final group and is generally performed by most malware codes.

In a seventh step which is the last step, the behavior pattern generating unit 180 stores the behavior pattern of the final group which is generated in the sixth step in the behavior pattern DB 160. The behavior pattern stored in the behavior pattern DB 160 may be utilized to determine whether a target process is a malware code.

In the meantime, the malware code detecting unit 190 serves to detect a malware code using a behavior pattern generated by the behavior pattern generating unit 180. A malware code detecting operation of the malware code detecting unit 190 will be described in more detail with reference to FIG. 5.

Referring to FIG. 5, the malware code detecting operation which is performed by the malware code detecting unit 190 will be described to be classified into four steps.

First, in a first step, when a target process is generated by executing a suspicious executable file, the malware code detecting unit 190 extracts an event of calling an API which is defined as a characteristic parameter by the behavior pattern generating unit 180 among APIs called by the target process. In this case, the malware code detecting unit 190 records the API which is called by the target process.

When the API calling event related with the characteristic parameter is extracted through the first step, the malware code detecting unit 190 generates an API call sequence as a second step.

In the second step, the malware code detecting unit 190 generates the API call sequence in accordance with a time order, based on the API calling event extracted by the target process. In this case, the malware code detecting unit 190 converts API call information into a text to be processed in accordance with the time order.

For example, the malware code detecting unit 190 may convert the API call information into an alphabet character based on the code information corresponding to the API call sequence defined in Table 1.

When the API call sequence is generated through the second step, the malware code detecting unit 190 analyzes a similarity for the behavior of the API call sequence as a third step.

In the third step, the malware code detecting unit 190 compares the behavior patterns stored in the behavior pattern DB 160 with a behavior pattern for the API call sequence of the target process generated in the second step and measures a similarity based on a comparison result.

In this case, the malware code detecting unit 190 may measure the similarity for the behavior pattern for the API call sequence of the target process using the following Equation 1.

$$\text{Similarity} = \frac{LCS_{(X,Y)\_Length}}{\text{Min\_Length}_{(X,Y)}} \times 100 \quad \text{Equation 1}$$

The malware code detecting unit 190 uses a sequence of the target process and the behavior pattern sequence of the malware code group stored in the behavior pattern DB 160 as an input value (X,Y) to calculate a longest common subsequence (LCS) of two sequences. In this case, the malware code detecting unit 190 applies a calculated length of the LCS and a shortest length of the two sequences (X,Y) to Equation 1 to measure the similarity of the two sequences (X,Y).

When the similarity is completely analyzed through the third step, the malware code detecting unit 190 determines a malware code based on the analysis result of the similarity for the behavior of the API call sequence as a fourth step.

When there is a behavior pattern which is similar to the behavior pattern for the API call sequence of the target process generated in the second step, among the behavior patterns stored in the behavior pattern DB 160, as a result of measuring a similarity, the malware code detecting unit 190 may determine that the API call sequence of the target process is a malware code.

The malware code detecting unit 190 stores the result of determining a similarity of the API call sequence for the target process in the storing unit 140 and reports the result to the control unit 110 like an operation 516. When the API call sequence of the target process is determined as a malware code, the malware code detecting unit 190 may additionally store the sequence in the behavior pattern DB 160. The sequence which is additionally stored may be used to update a behavior pattern later to be utilized to detect a malware code.

An operation flow of the control device according to the exemplary embodiment of the present invention configured as described above will be described below in detail.

FIGS. 6 and 7 are flowcharts illustrating flows of an operation for a malware code detecting method according to an exemplary embodiment of the present invention.

First, referring to FIG. 6, the malware code detecting apparatus defines a characteristic parameter which distinguishes and specifies behaviors of a malware code and normally executable programs in step S110. For example, the characteristic parameter may be defined as represented in Table 1 described above.

Next, the malware code detecting apparatus executes a malware code which is collected in advance in step S120 and extracts an API calling event which is defined as a characteristic parameter in step S110, among APIs called by a process when the malware code is executed in step S130.

The malware code detecting apparatus generates an API call sequence in accordance with a time order, based on the API calling event extracted in step S130, in step S140. In step S140, the malware code detecting apparatus converts API call information based on code information corresponding to the API call sequence defined in Table 1 into characters to process the characters in accordance with the time order.

Next, the malware code detecting apparatus classifies the API call sequence processed in step S140, in step S150. In step S150, the malware code detecting apparatus classifies the API call sequence three times using a decision tree and a multiple sequence alignment (MSA) algorithm and divides and merges the sequence in accordance with a common characteristic of the API call sequence through three classifying processes to classify the API call sequence into m final groups.

Finally, the malware code detecting apparatus generates the behavior pattern corresponding to the API call sequence of the final group which is classified during step S150 using the MSA algorithm and stores the generated behavior pattern in the behavior pattern DB in step S160.

The behavior patterns generated and stored in step S160 may be used to detect the malware code in FIG. 7.

Therefore, referring to FIG. 7, when a target process is generated due to execution of a suspicious executable file, the malware code detecting apparatus monitors the target process in step S210 and extracts an API calling event which is defined as a characteristic parameter in advance among the API calling event called by the detected target process in step S220.

The malware code detecting apparatus generates an API call sequence in accordance with a time order, based on the API calling event extracted in step S220, in step S230. In step S230, the malware code detecting apparatus converts API call information based on code information corresponding to the API call sequence defined in Table 1 into characters to process the characters in accordance with the time order.

Next, the malware code detecting apparatus calls the behavior pattern DB in step S240 to compare the API call sequence processed in step S230 with the API call sequence of the malware code stored in the behavior pattern DB to analyze a similarity of behaviors of two sequences in step S250.

As an analyzing result in step S250, when there is a behavior pattern similar to the behavior pattern for the API call sequence of the target process among behavior patterns stored in the behavior pattern DB, the malware code detecting apparatus determines the sequence as a malware code.

The malware code detecting apparatus determines whether the sequence is a malware code from the analyzing result in step S250, in step S260 and reports the determining result in step S280. When the sequence is determined as a malware code in step S260, the malware code detecting apparatus may additionally store the behavior pattern of the sequence in the behavior pattern DB in step S270.

The malware code detecting apparatus according to the present exemplary embodiment which operates as described above may be implemented as an independent hardware device. Further, the malware code detecting apparatus according to the present exemplary embodiment may be driven to be included in other hardware device such as a microprocessor or a general-purpose computer system, as at least one processor.

FIG. 8 is a view illustrating a configuration of a computing system to which an apparatus according to an exemplary embodiment of the present invention is applied. Referring to FIG. 8, a computing system 1000 may include at least one processor 1100, a memory 1300, a user interface input device 1400, a user interface output device 1500, a storage 1600, and a network interface 1700 which are connected to each other through a bus 1200.

The processor 1100 may be a semiconductor device which performs processings on commands which are stored in a central processing unit (CPU), or the memory 1300 and/or the storage 1600. The memory 1300 and the storage 1600 may include various types of volatile or non-volatile storage media. For example, the memory 1300 may include a read only memory (ROM) and a random access memory (RAM).

The method or a step of algorithm which has been described regarding the exemplary embodiments disclosed in the specification may be directly implemented by hardware or a software module which is executed by a processor 1100 or a combination thereof. The software module may be stored in a storage medium (that is, the memory 1300 and/or the storage 1600) such as a RAM, a flash memory, a ROM, an EPROM, an EEPROM, a register, a hard disk, a detachable disk, or a CD-ROM. An exemplary storage medium is coupled to the processor 1100 and the processor 1100 may read information from the storage medium and write information in the storage medium. As another method, the storage medium may be integrated with the processor 1100. The processor and the storage medium may be stored in an application specific integrated circuit (ASIC). The ASIC may be stored in a user terminal. As another method, the processor and the storage medium may be stayed in a user terminal as individual components.

It will be appreciated that various exemplary embodiments of the present invention have been described herein for purposes of illustration, and that various modifications, changes, and substitutions may be made by those skilled in the art without departing from the scope and spirit of the present invention.

Therefore, the exemplary embodiments of the present invention are provided for illustrative purposes only but not intended to limit the technical spirit of the present invention. The scope of the technical concept of the present invention is not limited thereto. The protective scope of the present invention should be construed based on the following claims, and all the technical concepts in the equivalent scope thereof should be construed as falling within the scope of the present invention.

What is claimed is:

1. A non-transitory computer readable medium with computer executable instructions stored thereon which, when executed by a processor, perform the following operations:
   defining a characteristic parameter which distinguishes and specifies behaviors of a malware code and normally executable programs;
   converting an API calling event corresponding to the defined characteristic parameter among API calling events called by a process generated by executing a previously collected malware code into a sequence;
   generating a behavior pattern in accordance with a similarity of converted sequences to store the behavior pattern in a behavior pattern database (DB);
   converting the API calling event corresponding to the defined characteristic parameter among the API calling events called by a target process into a sequence when the target process is executed; and
   determining whether the behavior pattern is a malware code in accordance with a similarity of the converted sequence and the sequence stored in the behavior pattern DB,
   wherein the behavior pattern generating unit generates an API call sequence in accordance with a time order based on an API calling event extracted for every process which is executed by the malware code and converts the API call sequence into a character sequence.

2. The non-transitory computer readable medium of claim 1, wherein the operations further comprise classifying the API call sequence corresponding to the API calling event into a plurality of groups using a decision tree which is trained in advance based on a statistic value of the API to be called, applying the API call sequence which belongs to each classified group to a multiple sequence alignment (MSA) algorithm to analyze a similarity for the behavior pattern of the API call sequence which belongs to each group, and classifying each group into a plurality of sub groups in accordance with the similarity for the behavior pattern of the API call sequence which belongs to the group.

3. The non-transitory computer readable medium of claim 2, wherein the operations further comprise merging the API call sequences of each classified sub group in accordance with a similar behavior pattern to classify the API call sequence into a plurality of final groups.

4. The non-transitory computer readable medium of claim 3, wherein the operations further comprise aligning API call sequences which belong to the plurality of classified final groups with respect to an area having a high similarity through the MSA algorithm, and generating a behavior pattern in accordance with an occurrence ratio of a character code corresponding to the API call sequence.

5. The non-transitory computer readable medium of claim 1, wherein the characteristic parameter is defined so that the API calling event which is called by a process by the malware code is classified and defined into 'Process', 'Thread', 'Memory', 'File', 'Registry', 'Network', 'Service', and 'Other' and character code information corresponding to each API calling event is defined.

6. The non-transitory computer readable medium of claim 1, wherein the time order is further based on the API calling event corresponding to a characteristic parameter among API calling events called by the target process.

7. The non-transitory computer readable medium of claim 6, wherein the operations further comprise using the generated API call sequence and a sequence of the malware code stored in the behavior pattern DB as an input value to calculate a longest common subsequence (LCS) of two sequences, and comparing the calculated length of the LCS and a shortest length of the two sequences to measure a similarity between two sequences.

8. The non-transitory computer readable medium of claim 1, wherein the operations further comprise storing a behavior pattern of the API call sequence which is detected as a malware code in the behavior pattern DB.

9. A malware code detecting method, comprising:
defining a characteristic parameter which distinguishes and specifies behaviors of a malware code and normally executable programs;
converting an API calling event of each process corresponding to the defined characteristic parameter among API calling events called by a process generated by executing a previously collected malware code into a sequence;
generating a behavior pattern in accordance with a similarity of converted sequences to store the generated behavior pattern in a behavior pattern database (DB);
converting an API calling event of a target process corresponding to the defined characteristic parameter among API calling events called by a target process when the target process is executed, into a sequence; and
determining whether the behavior pattern is a malware code in accordance with the similarity of the converted sequence and a sequence stored in the behavior pattern DB,
wherein in the converting of an API calling event of each process into an API call sequence, an API call sequence is generated in accordance with a time order based on an API calling event extracted for every process which is executed by the malware code and the API call sequence is converted into a character sequence.

10. The method of claim 9, further comprising:
before the storing of the generated behavior pattern into a behavior pattern DB,
classifying the API call sequence generated corresponding to the API calling event into a plurality of groups using a decision tree which is trained in advance based on a statistic value of the API to be called,
applying the API call sequence which belongs to each classified group to a multiple sequence alignment (MSA) algorithm to analyze a similarity for the behavior pattern of the API call sequence which belongs to each group and classifying each group into a plurality of sub groups in accordance with the similarity for the behavior pattern of the API call sequence which belongs to each group; and
merging the API call sequences of each classified sub group in accordance with a similar behavior pattern to classify the API call sequence into a plurality of final groups.

11. The method of claim 10, wherein the storing of the generated behavior pattern into a behavior pattern DB includes aligning API call sequences which belong to the plurality of classified final groups with respect to an area having a high similarity through the MSA algorithm and generating a behavior pattern in accordance with an occurrence ratio of a character code corresponding to the API call sequence.

12. The method of claim 9, wherein the time order is further based on the API calling event corresponding to a characteristic parameter among API calling events called by the target process.

13. The method of claim 9, wherein the determining of whether the behavior pattern is a malware code includes using the generated API call sequence and a sequence of the malware code stored in the behavior pattern DB as an input value to calculate a longest common subsequence (LCS) of two sequences; and
comparing the calculated length of the LCS and a shortest length of the two sequences to measure a similarity between two sequences.

14. The method of claim 9, further comprising:
additionally storing a behavior pattern of the API call sequence which is detected as a malware code in the behavior pattern DB.

* * * * *